(12) United States Patent
Falce et al.

(10) Patent No.: US 6,318,069 B1
(45) Date of Patent: Nov. 20, 2001

(54) ION THRUSTER HAVING GRIDS MADE OF ORIENTED PYROLYTIC GRAPHITE

(75) Inventors: Louis Raymond Falce, San Jose; John R. Beattie, Westlake Village, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/496,888

(22) Filed: Feb. 2, 2000

(51) Int. Cl.$^7$ ...................................................... F03H 1/00
(52) U.S. Cl. .......................................... 60/202; 313/360.1
(58) Field of Search .................... 60/202; 313/360.1, 313/361.1; 315/111.61

(56) References Cited

U.S. PATENT DOCUMENTS

| | | | |
|---|---|---|---|
| 4,538,067 | * | 8/1985 | Cuomo ............................ 250/396 R |
| 5,439,191 | * | 8/1995 | Nichols .............................. 244/169 |
| 5,924,277 | | 4/1999 | Beattie et al. . |

OTHER PUBLICATIONS

Reaves, et al. "Directly Heated Tungsten Dispenser Cathodes for Ion Laser Application" (1969) Laser Journal, 4 pages.

* cited by examiner

Primary Examiner—Timothy S. Thorpe
Assistant Examiner—Ehud Gartenberg
(74) Attorney, Agent, or Firm—T. Gudmestad

(57) ABSTRACT

An ion thruster includes a source of a plasma of ions and electrons, and an ion-optics system located in sufficient proximity to the source of the plasma to extract ions therefrom. The ion-optics system has at least two domed grids arranged in a facing-but-spaced-apart relationship to each other. Each grid has a local reference vector that is perpendicular to the surface of the grid and a reference plane perpendicular to the reference vector. Each of the grids is formed of anisotropic pyrolytic graphite having an "ab" crystallographic plane that lies substantially in the reference plane. In one form, the "ab" crystallographic plane lies coplanar with the reference plane at all locations on each domed grid made of pyrolytic graphite. In another form, the "ab" crystallographic plane has a constant orientation at all locations on the domed grid. In yet another form, wherein the ion-optics system has an axis of thrust, the "ab" crystallographic plane of the pyrolytic graphite lies substantially perpendicular to the axis of thrust.

19 Claims, 3 Drawing Sheets

ION THRUSTER HAVING GRIDS MADE OF ORIENTED PYROLYTIC GRAPHITE

BACKGROUND OF THE INVENTION

This invention relates to ion thrusters and, more particularly to the structure and material of construction of the grids used in the ion-optics system of the ion thruster.

Ion thrusters are used in spacecraft such as communications satellites for stationkeeping and other functions. An important advantage of the ion thruster over an engine using chemical propellants is that it utilizes the electrical power generated by the solar cells of the satellite to achieve the propulsion. The ion thruster requires relatively small amounts of a consumable propellant that is ionized, and it is not necessary to lift large masses of chemical fuel to orbit. The ion thruster also has a high specific impulse, making it an efficient engine which requires very little propellant.

In an ion thruster, a plasma of ions and electrons is created and confined within the body of the thruster. Ions from the plasma are electrostatically accelerated rearwardly by an ion-optics system. The reaction with the spacecraft drives it forwardly, in the opposite direction. An ion thruster is often built to be small in size, so that the force produced by the ion thruster is small. The ion thruster is therefore operated for a relatively long time. Consequently, for some missions, the ion thruster must be operable and reliable for thousands of hours of operation.

The ion-optics system includes grids to which appropriate voltages are applied in order to accelerate the ions rearwardly. The grids include aligned apertures therethrough. Some of the ions accelerated by the applied voltages pass through the apertures, providing the propulsion. Others of the ions impact the grids, heating them and etching away material from the grids. The heating and electrostatic forces on the grids combine to cause substantial mechanical forces at elevated temperature on the grids, which distort the grids and make them susceptible to fatigue and mechanical failure. These effects are taken into account in the design of the grids, so that they remain functional for the required extended lifetimes.

At the present time, the grids are typically made of molybdenum formed into a domed shape. It has also been proposed to make flat grids of carbon-carbon composite material. Both of these materials have limitations in respect to the lifetime of the grid and its mechanical strength. Accordingly, there is a need for a better material of construction and design for the grids of the ion-optics systems of ion thrusters. The present invention fulfills this need, and further provides related advantages.

SUMMARY OF THE INVENTION

The present invention provides an improved ion thruster and the grids used in its ion-optics system. The grids are made so as to allow heat produced during operation to be conducted away and also to have lower thermal expansion. The result is that the grids operate at lower temperature and experience lesser mechanical deformation than conventional grids. They have good strength, particularly when used in the preferred domed configuration.

In accordance with the invention, an ion thruster comprises a discharge cathode source of a plasma of ions and electrons, and an ion-optics system located in sufficient proximity to the source of the plasma to draw ions therefrom. The ion-optics system comprises at least two nonplanar, domed grids arranged in a facing-but-spaced-apart relationship to each other. Each grid may be described as having a local reference vector that is perpendicular to the surface of the grid and a reference plane perpendicular to the reference vector. At least one of the grids, and preferably all of the grids, is made of anisotropic pyrolytic graphite having an "ab" crystallographic plane that lies substantially in the reference plane.

Pyrolytic graphite is a highly anisotropic material. That is, its structure and properties vary greatly as a function of the direction of measurement relatively to its crystallographic directions. Its structure and properties are distinct from conventional graphite, amorphous carbon, graphite fibers, and carbon-carbon composite material, all of which are not operable in the present invention. The pyrolytic graphite has important advantages when used in the ion-optics system of an ion thruster, with the indicated orientation, based upon its different structure and properties from other forms of carbon and graphite.

In pyrolytic graphite, the "ab" crystallographic plane, also sometimes termed the "basal" direction, has a high coefficient of thermal conductivity. Heat produced by the impact of ions onto the grid is conducted rapidly away to heat sinks at the edge of the grid. Also, the thermal emittance of the pyrolytic graphite is much larger than that of metals such as molybdenum used in conventional ion-optics grids, so that a larger fraction of the heat resulting from the ion impacts is radiated away. In combination, these effects allow the pyrolytic graphite grid to operate at lower temperatures than conventional grids.

In pyrolytic graphite, the coefficient of thermal expansion in the "ab" crystallographic plane is low. For a given temperature increase, there is less distortion of the grid than for a metallic grid. The combination of low coefficient of thermal expansion and high coefficient of thermal conductivity in the "ab" crystallographic plane, and the high thermal emittance, results in less distortion of the grid and of its individual apertures than possible with other materials of construction. The apertures in the facing grids remain in a better alignment with the approach of the invention, resulting in better efficiency of the ion thruster as compared with conventional ion thrusters.

The ion etch rate for pyrolytic graphite, like other forms of carbon, is quite low. The lifetime of the pyrolytic graphite grids is therefore longer than that of metallic grids.

The pyrolytic graphite grids may be fabricated by any of several operable approaches. One approach involves machining the grid from a block of the pyrolytic graphite. In another approach, the pyrolytic graphite is deposited on a mandrel that defines the shape of the grid. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 2A–2B are schematic depictions of two embodiments of the grids of the ion-optics system, wherein FIG. 2A shows two domed grids, and FIG. 2B shows three domed grids;

FIGS. 3A–3B are schematic depictions of two embodiments of the structure of a grid, wherein FIG. 3A shows a portion of a domed grid made of pyrolytic graphite with a varying crystallographic orientation, and FIG. 3B shows a portion of a domed grid made of pyrolytic graphite with a constant crystallographic orientation.

DETAILED DESCRIPTION OF THE INVENTION

Figure 1:
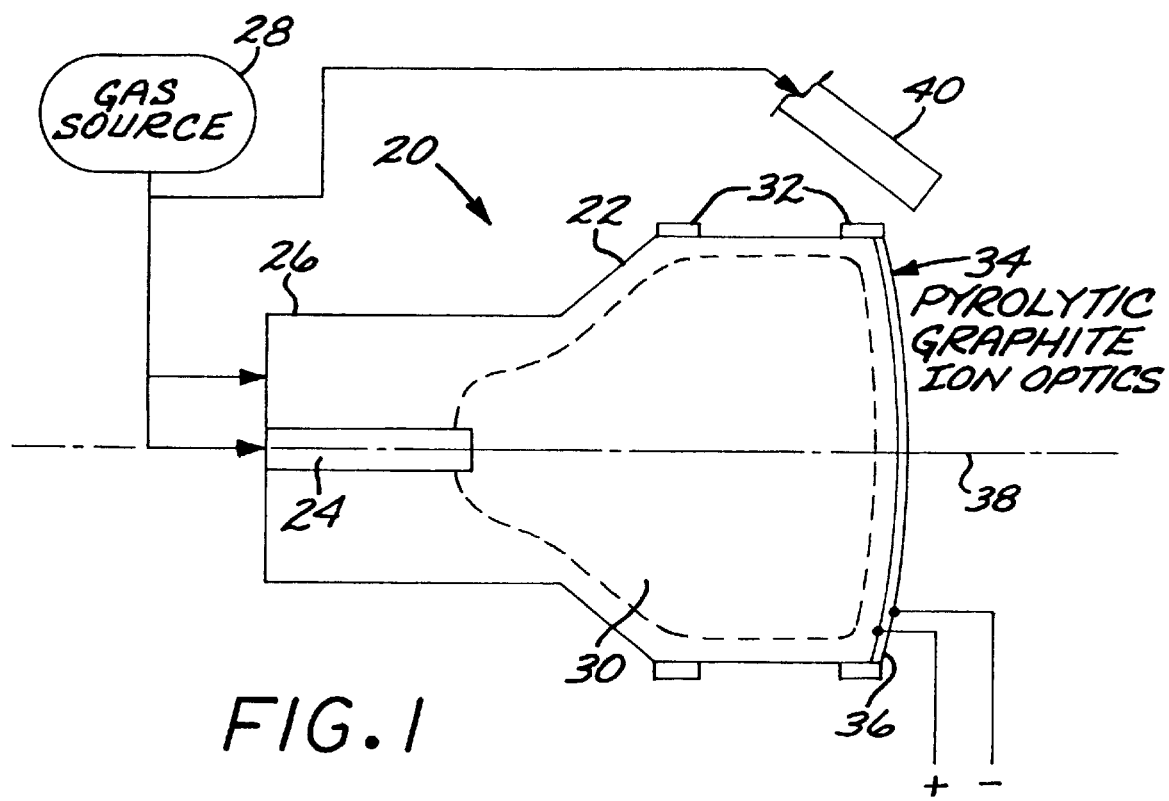
FIG. 1 is a schematic depiction of an ion thruster.

FIG. 1 depicts in general form an ion thruster 20. Ion thrusters are known in the art, except for the improvements to be discussed herein. See, for example, U.S. Pat. 5,924,277. Accordingly, only the basic features of the ion thruster 20 are described here for reference and for establishing the setting of the ion-optics system.

The ion thruster 20 includes a housing 22 having a discharge cathode (plasma source) 24 at a first end 26. A propellant gas, such as xenon, from a source 28 is injected into the housing 22 at the first end 26 and through the discharge cathode 24, and also through a neutralizer cathode 40. Electrons emitted from the discharge cathode 24 ionize the propellant gas, creating a plasma 30 of electrons and positively charged ions within a central portion of the housing 22. Magnets 32 confine and shape the plasma 30.

Ions are electrostatically extracted from the plasma 30 by an ion-optics system 34 at a second end 36 of the housing 22 and accelerated out of the housing 22 (to the right in FIG. 1), generally along an axis of thrust 38 as an ion beam. The housing 22 is generally symmetrical about the axis of thrust 38 in the preferred embodiment. The ionic mass accelerated to the right in FIG. 1 drives the housing 22, and the spacecraft to which it is affixed, to the left in FIG. 1. The ionic charge of the ion beam may be neutralized by injection of electrons into the ion beam by the neutralizer cathode 40.

Figure 2A:
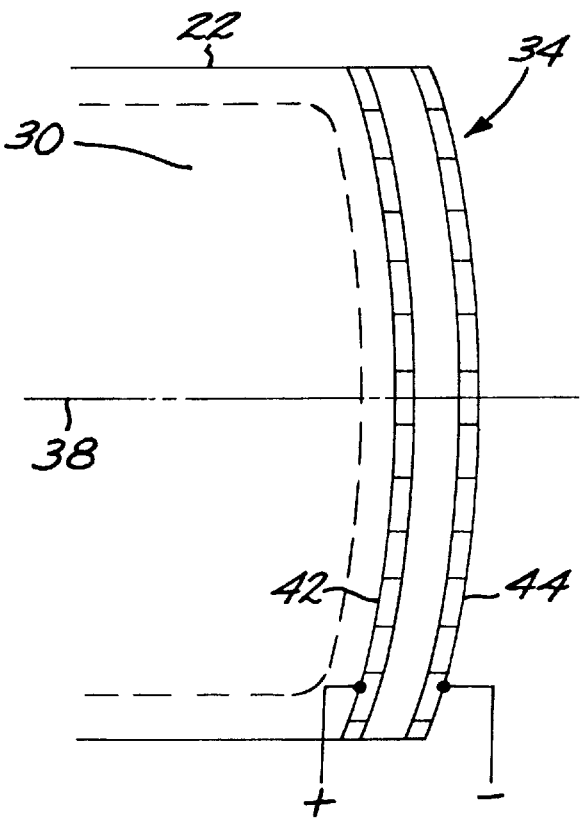
Figure 2B:
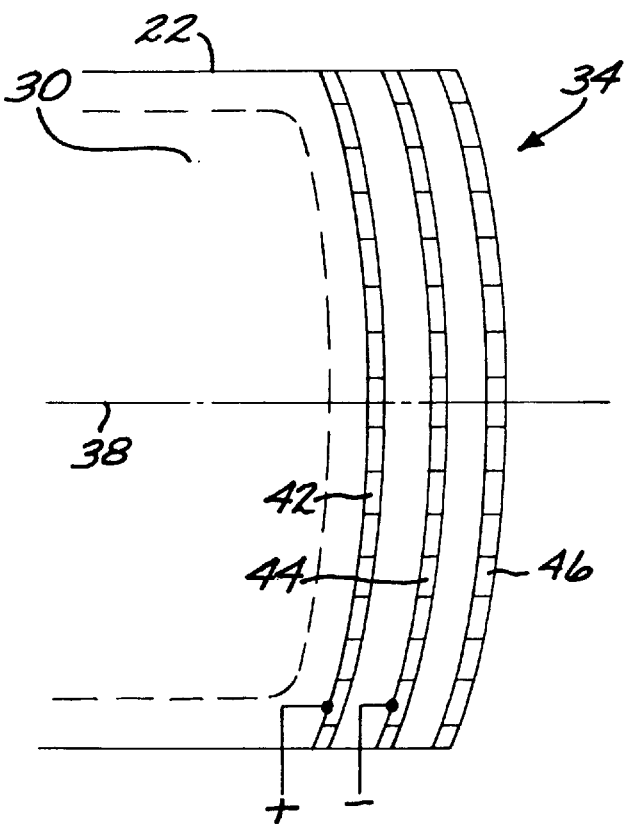

As shown in FIGS. 2A and 2B, the ion-optics system 34 includes at least two grids that selectively extract and accelerate the ions from the plasma 30. Each grid is a solid body with apertures therethrough to permit ions to pass through the apertures. In a two-grid design of FIG. 2A, a screen grid 42 adjacent to the plasma 30 is positively charged. An accelerator grid 44 positioned outwardly of the screen grid 42 is negatively charged. A three-grid design of FIG. 2B includes the same screen grid 42 and accelerator grid 44, but adds a decelerator grid 46 positioned so that the accelerator grid 44 is between the screen grid 42 and the decelerator grid 46. The decelerator grid 46 is maintained at, or very near, zero potential, thereby defining the precise axial location of the neutralization plane.

The grids 42, 44, and, where present, 46 are in a facing-but-spaced apart relationship to each other. In a design of interest to the inventors, each grid 42, 44, and 46 is typically about 0.010 inch thick, and is spaced from the adjacent grid or grids by a distance of about 0.035 inches at room temperature. The grids 42, 44, and 46 are not flat, but instead are domed slightly. Preferably, each grid 42, 44, and 46 is a segment of a sphere. In a design of interest to the inventors, each grid 42, 44, and 46 is cylindrically symmetric about the axis 38 and is about 25 centimeters in diameter. The center of each grid is displaced along the axis 38 from a plane defined by the circumference of each grid by about 1 centimeter. That is, each grid is only very slightly domed. The grids are illustrated as domed outwardly relatively to the center of the housing 22, but they could be domed inwardly. All of the grids in any one set are domed in the same direction.

Figure 3A:
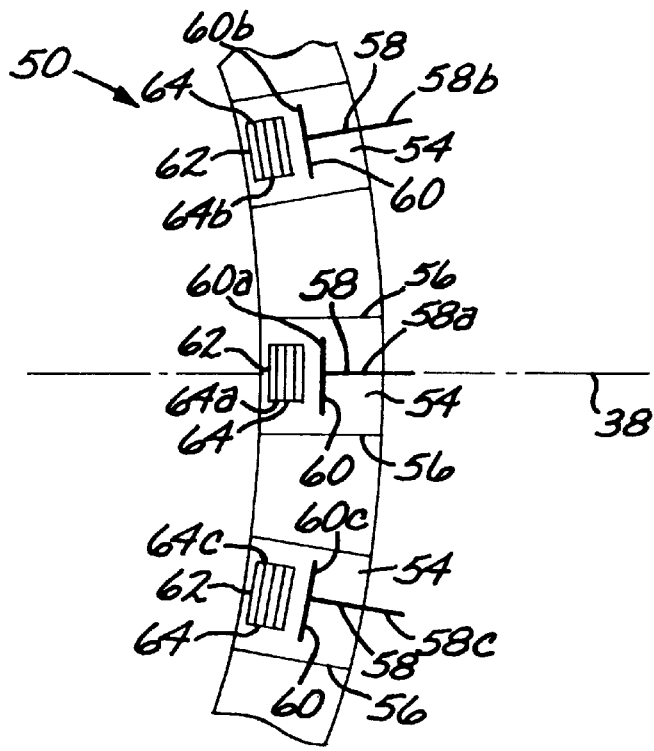
Figure 3B:
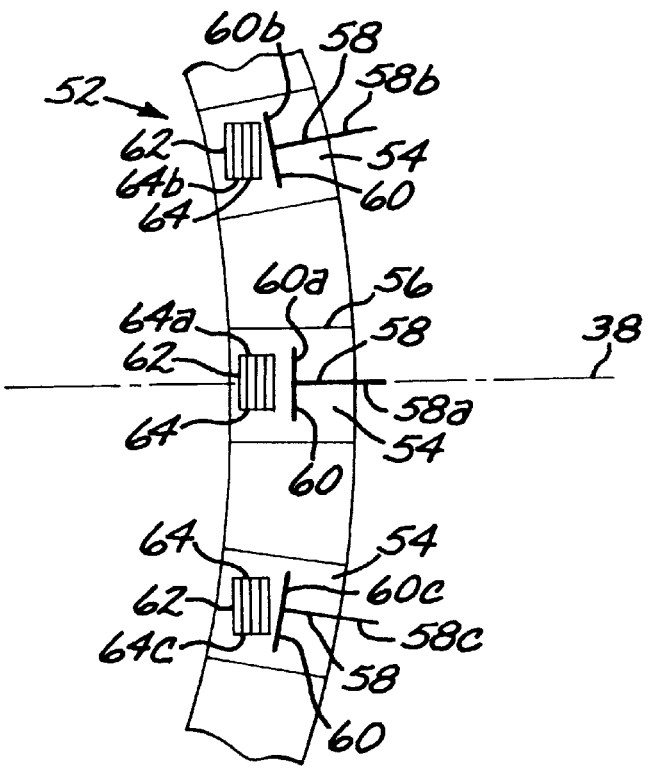

FIG. 3A illustrates the structure of a domed grid 50, and FIG. 3B illustrates the structure of another domed grid 52. (The curvatures of the grids in FIGS. 3A and 3B are exaggerated, to better illustrate the orientations discussed below.) The grids 50 and 52, which are both within the scope of the invention, could be any one of the grids 42, 44, and 46. Preferably, all of the grids 42, 44, and 46 are either of the type of grid 50 or of the type of grid 52.

The grid 50 includes a body 54 having a number of solid regions and apertures 56 therethrough between the regions of the body 54. The apertures 56 define openings which extend generally parallel to the axis of thrust 38. Each of the regions of the body 54 may be described as having a local reference vector 58 that is perpendicular to the surface of the grid 50 at that point on its surface. Because the grid 50 is domed, the reference vectors 58 are not all parallel to each other. A reference vector 58a at the center of the dome is parallel to the axis of thrust 38, but other reference vectors 58b and 58c, at regions that are displaced laterally from the axis of thrust 38, are not precisely parallel to the axis of thrust 38 or to the other reference vectors 58. The angular displacement of the reference vectors 58 from each other is a function of the curvature of the grid 50 and the lateral displacement between two reference vectors. Each of the reference vectors has a reference plane 60 lying perpendicular to the reference vector 58. The respective reference planes 60a, 60b, and 60c are not exactly parallel to each other because the grid 50 is curved, as discussed above in relation to the reference vectors 58.

The body 54 of the grid 50 is made of pyrolytic graphite. Pyrolytic graphite has properties that make it highly advantageous in the manufacture of grids 50. It is black in color, and therefore has a high thermal emissivity. When the grids 42, 44, and 46 are operated, ions impact on the regions of the body 54, heating the body 54. The high thermal emissivity produces a high radiation of heat from the body 54, helping to maintain it at a relatively low temperature. The greater the temperature change, the more distortion of the grid as a result of its positive coefficient of thermal expansion. Another advantageous property of the pyrolytic graphite is that it is resistant to material removal by impact of the ions, a process generally termed physical sputtering. The rate of material removal during the physical sputtering of the pyrolytic graphite is about 1/10 of that of molybdenum, the conventional material of construction of grids 50.

The present invention is specific to the use of pyrolytic graphite, which is a highly anisotropic form of graphite. The grids of the invention must be made of pyrolytic graphite. The present approach utilizes the anisotropy of the pyrolytic graphite to advantage in constructing the grid. The structure and properties of highly anisotropic pyrolytic graphite are distinct from conventional graphite, amorphous carbon, graphite fibers, carbon-carbon composite material, and other forms, all of which are not operable in and not within the scope of the present invention. Pyrolytic graphite is well known in other fields and for other uses, but its basic features as pertinent to the present invention will be summarized briefly.

Figure 4:
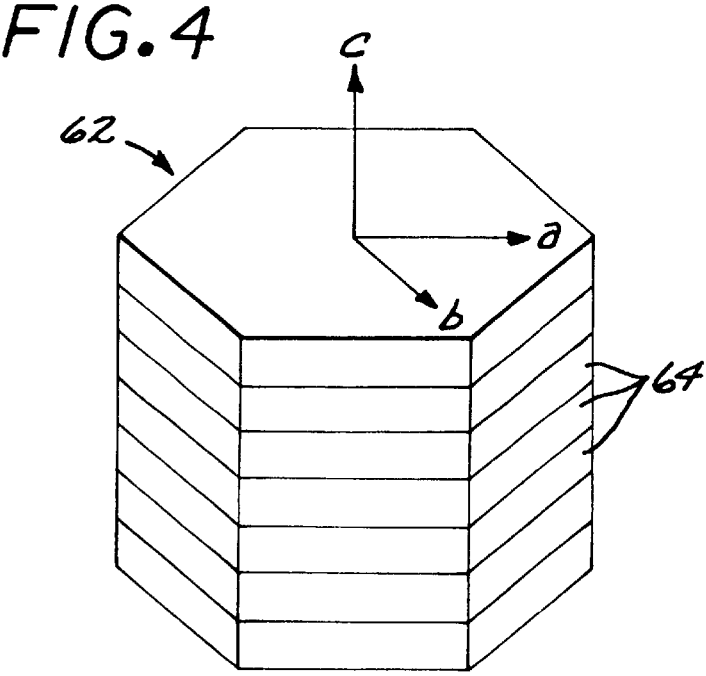
FIG. 4 is a schematic illustration of the crystallographic structure of anisotropic pyrolytic graphite.

FIG. 4 schematically illustrates the structure of pyrolytic graphite 62. The pyrolytic graphite 62 is formed of a series of layers 64. Each layer 64 is substantially the same as each other layer, except that adjacent layers are spatially shifted slightly from each other in the stacking sequence. Each layer 64 is generally planar with crystallographic directions "a" and "b" lying in the plane, and with a crystallographic "c" direction perpendicular to the plane. The layers 64 are therefore often termed an "ab" crystallographic plane or "basal" plane. Defining the layers 64 in this manner is important, because the physical properties of the pyrolytic graphite are highly anisotropic. The thermal expansion coefficient of pyrolytic graphite is about $0.68$–$0.9 \times 10^{-6}$ inch/inch/° F. in the "ab" crystallographic plane, and is about $13.1$–$14.2 \times 10^{-6}$ inch/inch/° F. in the "c" crystallographic direction. The thermal conductivity of pyrolytic graphite is about 176–200 BTU/hour square foot/foot° F. at room temperature in the "ab" crystallographic plane, and is about 1 BTU/hour square foot/foot° F. at room temperature in the "c" crystallographic direction.

That is, the thermal expansion is small in the "ab" crystallographic plane, and the thermal conductivity is large in the "ab" crystallographic plane. This large anisotropy in properties may be used to advantage in the grid 50. It is highly desirably that the grid 50 have a small thermal expansion in directions lying substantially parallel to the reference planes 60, and also have a large thermal conductivity in directions lying substantially parallel to the reference planes 60. The high thermal conductivity results in a large amount of heat being conducted from the central portions of the grid 50 to the housing 22 at its edge through the body 54 of the grid 50, which housing serves as a heat sink. The coefficient of thermal expansion in the reference plane 60 is also small. Because distortion of the grid is a function of the product of the temperature change times the coefficient of thermal expansion, the use of the pyrolytic graphite with the "ab" crystallographic plane (i.e., the layers 64) substantially coplanar with the reference plane 60 results in minimal dimensional changes and distortion of the grid 50 during service. This minimization of distortion is important, so that the adjacent pairs of grids (42,44) and (44,46) do not contact each other during service to cause a short, or approach each other sufficiently close to cause electrical breakdown between them, and so that the individual beamlets passing through the apertures are not vectored electrostatically due to the aperture offset that would accompany any distortion.

In FIG. 3A, the pyrolytic graphite 62 is indicated, with its orientation depicted by the orientations of the layers 64. In this case, the layers 64 are parallel to the respective reference planes 60. That is layer 64a is parallel to reference plane 60a; layer 64b is parallel to reference plane 60b; and layer 64c is parallel to reference plane 60c. This type of orientation, with the layers 64a, 64b, and 64c not exactly parallel to each other but parallel to their respective reference planes 60a, 60b, and 60c, may be achieved by epitaxial vapor growth of the pyrolytic graphite on a mandrel whose end is curved with the same domed shape as the grid 52.

FIG. 3B depicts another embodiment, which is similar to that of FIG. 3A, except as discussed next. The above discussion of elements is incorporated here, to the extent appropriate. The embodiment of FIG. 3B differs from that of FIG. 3A in that the layers 64a, 64b, and 64c are all parallel to each other. Consequently, they are not exactly parallel to their respective reference planes 60a, 60b, and 60c in all cases, the difference being due to the curvature of the grid 50. The layers 64a, 64b, and 64c, and thence the "ab" crystallographic planes, are all parallel to a common axis. This common axis is most preferably the axis of thrust 38, which is also the axis of symmetry of the ion thruster 20. This type of orientation, with the layers 64a, 64b, and 64c perpendicular to the axis of thrust 38, may be achieved by providing a block of previously grown pyrolytic graphite, and then machining the grid 50 out of the block.

The embodiments of FIGS. 3A and 3B are both within the concept that the "ab" crystallographic plane lies "substantially in the reference plane". Because the grid 50 is only slightly curved into a dome shape, both of these embodiments allow the effective realization of the benefits of the anisotropy of the pyrolytic graphite. The embodiments of FIGS. 3A and 3B are therefore both within the scope of the present invention. Preferably, the "ab" crystallographic plane 64 has an angle of no more than 20 degrees to the reference plane 60, although larger angles are operable but less effective.

The coupling of the use of anisotropic pyrolytic graphite with a domed shape of the grids 42, 44, and 46 provides surprising and unexpected advantages. As noted, the domed grids are typically very closely spaced at room temperature—only about 0.035 inch apart in a preferred embodiment. When other materials of construction are used to make the grids in this domed shape, the distortion of the grids as they are heated to their service temperature is much larger (about 10 times as much) than in the present approach, and the room-temperature spacing of 0.035 inch decreases to about 0.018 inches at the final temperature of operation. There is accordingly a much greater likelihood of contact or close approach of the adjacent grids, with a resulting greater likelihood of failure due to electrical breakdown or shorting and a greater likelihood of electrostatic vectoring of the beamlets due to aperture offset. This problem is of particular concern when the ion thruster is started, and there are transient thermal conditions in which the grid gap closes up even more than it does under steady-state thermal conditions. With the present approach, this problem is largely negated, resulting in improved reliability and lifetime of the ion thruster. Because the pyrolytic graphite grids do not move together as much during the thermal transient in the present approach, it is expected that thrusters equipped with the present invention will be capable of throttling from an OFF condition to full thrust instantaneously. With other materials of construction, ion thrusters typically have to be throttled up to full thrust (power) over a finite duration on the order of 10 minutes or longer, complicating the thruster power controller.

The present invention has been reduced to practice with two sets of two-grid ion optics assemblies employing the present approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An ion thruster, comprising:
   a source of a plasma of ions and electrons; and
   an ion-optics system located in sufficient proximity to the source of the plasma to extract ions therefrom, the ion-optics system comprising at least two nonplanar, domed grids arranged in a facing-but-spaced-apart relationship to each other, each grid having a local reference vector that is perpendicular to the surface of the grid and a reference plane perpendicular to the reference vector, at least one of the grids being made of anisotropic pyrolytic graphite having an "ab" crystallographic plane that lies substantially in the reference plane.

2. The ion thruster of claim 1, wherein the at least two grids having nonplanar, domed shapes each have the form of a segment of a sphere.

3. The ion thruster of claim 1, wherein there are exactly two grids, and each of the two grids is made of anisotropic pyrolytic graphite oriented such that the "ab" crystallographic plane lies substantially in the reference plane of the respective grid.

4. The ion thruster of claim 1, wherein there are exactly three grids, and each of the three grids is made of anisotropic pyrolytic graphite oriented such that the "ab" crystallographic plane lies substantially in the reference plane of the respective grid.

5. The ion thruster of claim 1, wherein the ion-optics system has an axis of thrust, and wherein the "ab" crystallographic plane of the pyrolytic graphite lies substantially perpendicular to the axis of thrust.

6. The ion thruster of claim 1, wherein the "ab" crystallographic plane lies coplanar with the reference plane at all locations on each domed grid made of pyrolytic graphite.

7. The ion thruster of claim 1, wherein the "ab" crystallographic plane has a constant orientation at all locations on the domed grid.

8. The ion thruster of claim 1, wherein the "ab" crystallographic plane has an angle to the reference plane of no more than 20 degrees.

9. An ion thruster, comprising:

a source of a plasma of ions and electrons; and an ion-optics system having an axis of thrust and located in sufficient proximity to the source of the plasma to extract ions therefrom, the ion-optics system comprising at least two domed grids arranged in a facing-but-spaced-apart relationship to each other, each grid being made of anisotropic pyrolytic graphite having an "ab" crystallographic plane that lies substantially perpendicular to the axis of thrust.

10. The ion thruster of claim 9, wherein each of the grids has the form of a segment of a sphere.

11. The ion thruster of claim 9, wherein there are exactly two grids.

12. The ion thruster of claim 9, wherein there are exactly three grids.

13. An ion thruster, comprising:

a source of a plasma of ions and electrons; and an ion-optics system located in sufficient proximity to the source of the plasma to extract ions therefrom, the ion-optics system comprising at least two domed grids arranged in a facing-but-spaced-apart relationship to each other, each grid having a local reference vector that is perpendicular to the surface of the grid and a reference plane perpendicular to the reference vector, each of the grids being formed of anisotropic pyrolytic graphite having an "ab" crystallographic plane that lies substantially in the reference plane.

14. The ion thruster of claim 13, wherein each of the grids has the form of a segment of a sphere.

15. The ion thruster of claim 13, wherein there are exactly two grids.

16. The ion thruster of claim 13, wherein there are exactly three grids.

17. The ion thruster of claim 13, wherein the ion-optics system has an axis of thrust, and wherein the "ab" crystallographic plane of the pyrolytic graphite lies substantially perpendicular to the axis of thrust.

18. The ion thruster of claim 13, wherein the "ab" crystallographic plane lies coplanar with the reference plane at all locations on each domed grid made of pyrolytic graphite.

19. The ion thruster of claim 13, wherein the "ab" crystallographic plane has a constant orientation at all locations on the domed grid.

* * * * *